(12) United States Patent
Buis et al.

(10) Patent No.: US 7,966,814 B2
(45) Date of Patent: Jun. 28, 2011

(54) INTERNAL COMBUSTION ENGINE CONTROL METHOD

(76) Inventors: Emmanuel Buis, Sceaux (FR); Sebastien Rouch, Paris (FR)

( * ) Notice: Subject to any disclaimer, the term of this patent is extended or adjusted under 35 U.S.C. 154(b) by 719 days.

(21) Appl. No.: 11/916,387

(22) PCT Filed: May 29, 2006

(86) PCT No.: PCT/FR2006/050491
§ 371 (c)(1),
(2), (4) Date: Jan. 28, 2008

(87) PCT Pub. No.: WO2007/000551
PCT Pub. Date: Jan. 4, 2007

(65) Prior Publication Data
US 2008/0196405 A1 Aug. 21, 2008

(30) Foreign Application Priority Data

Jun. 1, 2005 (FR) ..................................... 05 05555
Sep. 9, 2005 (FR) ..................................... 05 52722

(51) Int. Cl.
*F02D 23/00* (2006.01)
*F02D 41/14* (2006.01)
(52) U.S. Cl. ........................... 60/602; 60/605.2; 701/103
(58) Field of Classification Search .................... 60/602, 60/605.2; 701/103, 108, 110; 73/118.1, 73/118.2
See application file for complete search history.

(56) References Cited

U.S. PATENT DOCUMENTS

| 5,228,368 | A | 7/1993 | Kato et al. | |
| 6,155,049 | A * | 12/2000 | Bischoff | 60/602 |
| 6,247,311 | B1 * | 6/2001 | Itoyama et al. | 60/602 |
| 6,272,859 | B1 | 8/2001 | Barnes et al. | 60/602 |
| 6,298,718 | B1 | 10/2001 | Wang | 73/118.1 |
| 7,296,561 | B2 * | 11/2007 | Shirakawa et al. | 60/602 |
| 7,380,447 | B2 * | 6/2008 | Rollinger et al. | 73/118.2 |
| 7,389,173 | B1 * | 6/2008 | Wang | 60/602 |
| 7,853,395 | B2 * | 12/2010 | Guo et al. | 701/102 |
| 2003/0000212 | A1 | 1/2003 | Meier et al. | 60/602 |
| 2003/0116150 | A1 | 6/2003 | Kobayashi et al. | 123/674 |
| 2003/0182940 | A1 | 10/2003 | Nishiyama et al. | 60/602 |
| 2008/0243361 | A1 * | 10/2008 | Wang | 701/103 |

FOREIGN PATENT DOCUMENTS

| DE | 101 54 151 | | 5/2003 |
| EP | 1 178 192 | | 2/2002 |
| EP | 1 550 800 | | 7/2005 |
| GB | 2 105 878 | | 3/1983 |
| JP | 2008128141 | A * | 6/2008 |
| WO | WO 2006050383 | A2 * | 5/2006 |

* cited by examiner

*Primary Examiner* — Thai Ba Trieu
(74) *Attorney, Agent, or Firm* — Oblon, Spivak, McClelland, Maier & Neustadt, L.L.P.

(57) ABSTRACT

A method for controlling an internal combustion engine that includes a booster system including a turbocharger, an exhaust gas recirculation system including a recirculation valve and an electronic control unit for controlling geometrical configuration of the turbocharger and the recirculation valve of the recirculation system. The method detects variation of an acceleration command of the internal combustion engine when the booster system operates according to a first controlled operating mode, switches the booster system to a transitory operating mode according to the detected variation, wherein the turbocharger is maintained in a given geometrical configuration for a predetermined time, and switches the booster system to a second controlled operation mode.

12 Claims, 7 Drawing Sheets

INTERNAL COMBUSTION ENGINE CONTROL METHOD

BACKGROUND

The invention relates to supercharging systems associated with internal combustion engines in motor vehicles.

Supercharging systems make it possible to increase the quantity of air admitted into the engine. Supercharging systems comprise a turbocompressor formed of a turbine and of a compressor coupled to the turbine. An electronic control unit which controls the general operation of the engine makes it possible to control the supercharging system.

The turbine is disposed at the exit of the exhaust manifold and is driven by the exhaust gases.

The compressor is disposed upstream of the engine air intake manifold and is able to compress the air admitted by the engine. The compressor is driven by the turbine.

In the case of a supercharging system comprising a fixed-geometry turbocompressor (FGT), the power provided to the turbine by the exhaust gases can be modulated by means of a discharge valve able to tap off a part of the exhaust gases at the turbine inlet. In the case of a supercharging system comprising a variable-geometry turbocompressor (VGT), the power provided to the turbine by the exhaust gases can be modulated by means of adjustable vanes at the turbine inlet.

For this purpose, an actuator controlled by the electronic control unit makes it possible to drive the opening and closing of the valve or vanes of the turbocompressor.

Currently, the requirements in terms of responsiveness of diesel engines lead to the imposition on supercharging systems of constraints demanding very short response times. It follows that the electronic control unit is programmed to drive the turbocompressor at operating points approaching the operating limits of the turbocompressor.

In particular, under certain conditions, when the driver of the vehicle lifts his foot abruptly from the accelerator pedal, a pumping phenomenon occurs which manifests itself through large oscillations of the air flow rate into the intake manifold of the engine. This pumping phenomenon is prejudicial to the operation of the engine and can cause deterioration in the turbocompressor. Furthermore, this pumping phenomenon is unpleasant for the driver (appearance of air noise, loss of engine power).

Document DE 101 54 151 A1 describes a method for limiting the pumping phenomenon during a phase of sudden dip in injection. The method comprises a step consisting in detecting a variation in the acceleration command and a step consisting in, as a function of this variation, maintaining the variable-geometry turbocompressor in a maximum opening configuration.

This method does not enable the pressure at the outlet of the compressor to be made to drop as rapidly as possible nor does it make it possible to maintain the air flow rate into the intake since it is limited by the engine speed.

Furthermore, the effectiveness of this method depends on the setting of the parameters for regulating the regulated operating mode.

BRIEF SUMMARY

A problem solved by the invention is to propose a method making it possible to avoid the appearance of a pumping phenomenon during a foot lifting phase.

Another problem solved by the invention is the maintaining of the intake air flow rate upon a foot lifting of the driver.

This problem is solved within the framework of the present invention by virtue of a method of controlling an internal combustion engine comprising a supercharging system including a turbocompressor, an exhaust gas recirculation system including a recirculation valve and an electronic control unit able to control a geometric configuration of the turbocompressor and of the exhaust gas recirculation valve comprising steps consisting in:
  while the supercharging system is operating according to a first regulated operating mode, detecting a variation in an engine acceleration command,
  as a function of the detected variation, toggling the supercharging system into a transient operating mode in which the turbocompressor is maintained in a given geometric configuration for a predetermined duration,
  toggling the supercharging system into a second controlled operating mode.

The expression "geometric configuration" is understood within the framework of the present invention to mean a position of the gas recirculation valve or a position of the discharge valve (in the case of a fixed-geometry turbocompressor) or else a position of the vanes (in the case of a variable-geometry turbocompressor).

The method according to the invention can comprise a step consisting as a function of the detected variation, toggling the exhaust gas recirculation system into a transient operating mode (EGR_AS_SP).

With the method of the invention, it is possible, in the transient operating mode, to control the discharge valve or the position of the vanes and the position of the exhaust gas recirculation valve to rapidly drain the air in the intake manifold. Specifically, the opening of the vanes of the turbocompressor or of the discharge valve causes the pressure upstream of the turbine to drop rapidly. The supercharge pressure then becomes greater than the pressure upstream of the turbine A pressure difference then exists across the terminals of the exhaust gas recirculation valve. The opening of the valve for recirculating the burnt gases causes accelerated drainage of the air contained in the intake manifold towards the exhaust circuit. In this typical case, the recirculation valve is no longer used to recycle the exhaust gases but returns the cool air directly to the exhaust circuit. This results in still faster drainage of the intake manifold and maintains the level of the air flow rate higher since the internal combustion engine is short-circuited.

The effectiveness of the method of the invention is independent of the setting of the parameters for regulating the regulated operating mode. Specifically, during a foot lifting, the supercharging and exhaust gas recirculation systems each enter an unregulated operating mode. This is why it is not necessary to adapt the regulating parameters to accentuate the opening of the vanes or recirculation valve with a view to improving the effectiveness of the drainage of the air in the intake manifold.

The method may furthermore exhibit the following characteristics:
  during the transient operating mode, the position of the exhaust gas recirculation valve is maintained in a given geometric configuration for a predetermined duration or is controlled as a function of an operating point of the engine,
  the step of detecting a variation in an engine acceleration command comprises a step consisting in comparing a flow rate of fuel injected into the engine with a first threshold and in determining whether the injected fuel flow rate is less than the first threshold,
  the first threshold depends on the speed of the engine, the predetermined duration depends on the engine speed,
the predetermined duration depends on the rate of compression of air by the turbocompressor,
in the first regulated operating mode the geometric configuration of the turbocompressor is controlled as a function of a comparison between a parameter of measured pressure of air admitted by the engine and a setpoint pressure parameter,
in the second controlled operating mode the geometric configuration of the turbocompressor is controlled as a function of an operating point of the engine,
the step of detecting a variation in an engine acceleration command comprises a step consisting in comparing a flow rate of fuel injected into the engine with a second threshold and in determining whether the injected fuel flow rate is greater than the second threshold,
the second threshold is greater than the first threshold and depends on the engine speed.

The invention also relates to an electronic control unit intended to control the operation of the engine and programmed to implement the foregoing method.

BRIEF DESCRIPTION OF THE DRAWINGS

Other characteristics and advantages will emerge further from the description which follows, which is purely illustrative and nonlimiting and should be read in regard to the appended figures, among which.

DETAILED DESCRIPTION

Figure 1:
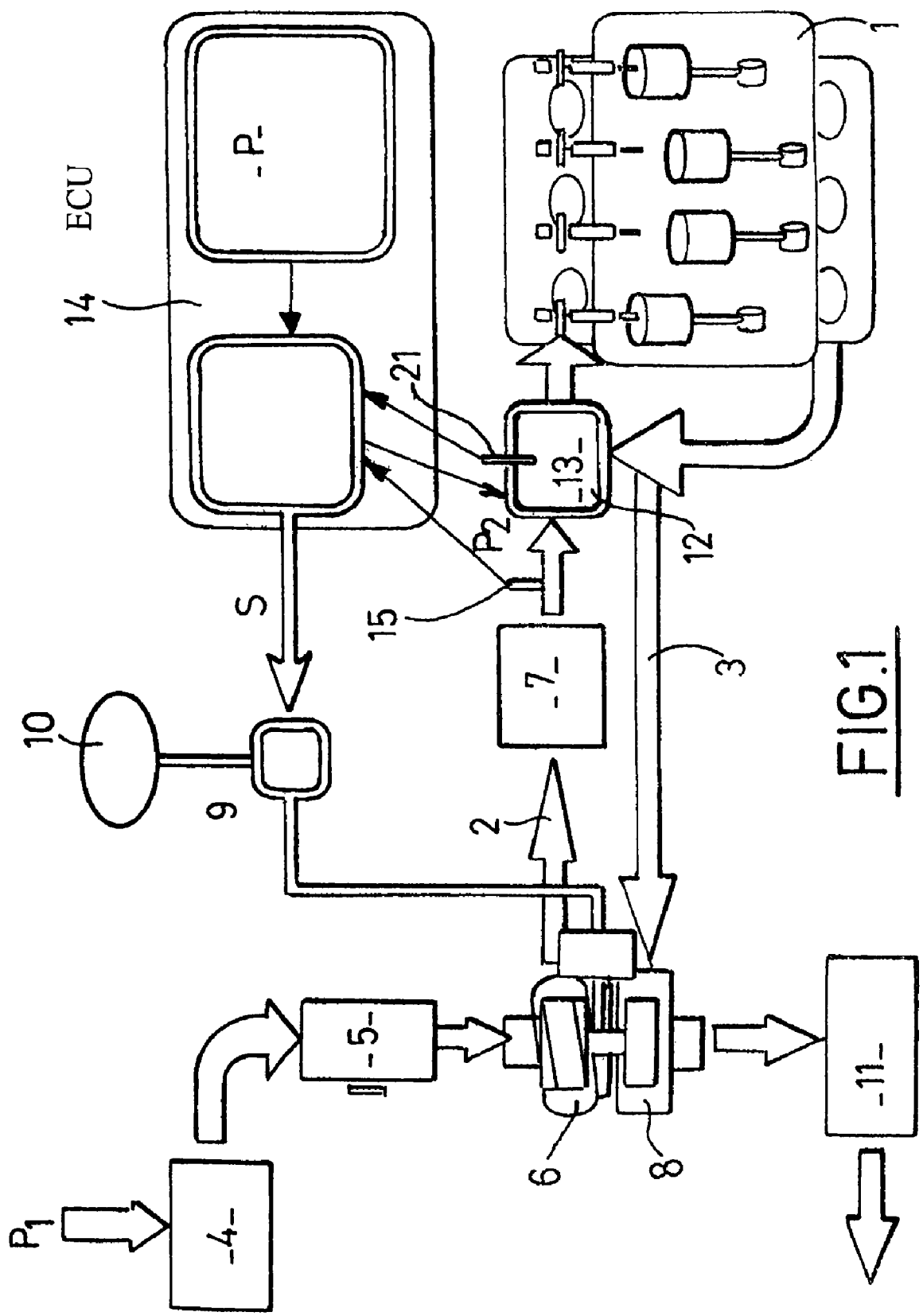
FIG. 1 represents in a diagrammatic manner a motorization block including a supercharging system and an exhaust gas recirculation system.

In FIG. 1, the motorization block represented comprises an internal combustion engine of diesel type 1 connected on the one hand to an intake circuit 2 intended to feed the engine 1 with cool air tapped off from outside the vehicle and on the other hand to an exhaust circuit 3 intended to discharge the exhaust gases produced by the engine.

The intake circuit 2 comprises an air filter 4, a flowmeter 5 able to measure the flow rate of cool air admitted into the intake circuit 2, a compressor 6 intended to increase the pressure of the cool air admitted and an exchanger 7 intended to cool the air at the outlet of the compressor 6.

The exhaust circuit 3 comprises a variable-geometry turbine driven 8 by the exhaust gases at the outlet of the engine, a solenoid valve 9 linked to a vacuum pump 10 able to modify the position of the vanes of the turbine 8, a particulate filter 11.

The motorization block represented also comprises an exhaust gas recirculation circuit (EGR) 12 intended to inject a part of the exhaust gases into the intake circuit 2 of the engine 1. The exhaust gas recirculation circuit 12 comprises a valve 13 whose opening can be controlled to modify the quantity of exhaust gas injected into the intake manifold and a position sensor 21 for said valve.

The motorization block also comprises an electronic control unit (ECU) 14 which manages the whole operation of the motorized block. The electronic control unit 14 is in particular programmed to control the solenoid valve 9 to drive the position of the vanes of the variable-geometry turbine 8, and to control the position of the exhaust gas recirculation valve 13.

The electronic control unit 14 receives data relating to the flow rate of cool air ($Q_{af}$) admitted originating from the flowmeter 5, pressure data (P2) originating from a pressure sensor 15 disposed in the intake manifold of the engine, upstream of the valve 13 of the exhaust gas recirculation circuit and data relating to the position of the exhaust gas recirculation valve originating from the position sensor 21.

A first embodiment of the method will now be described.

Figure 2:
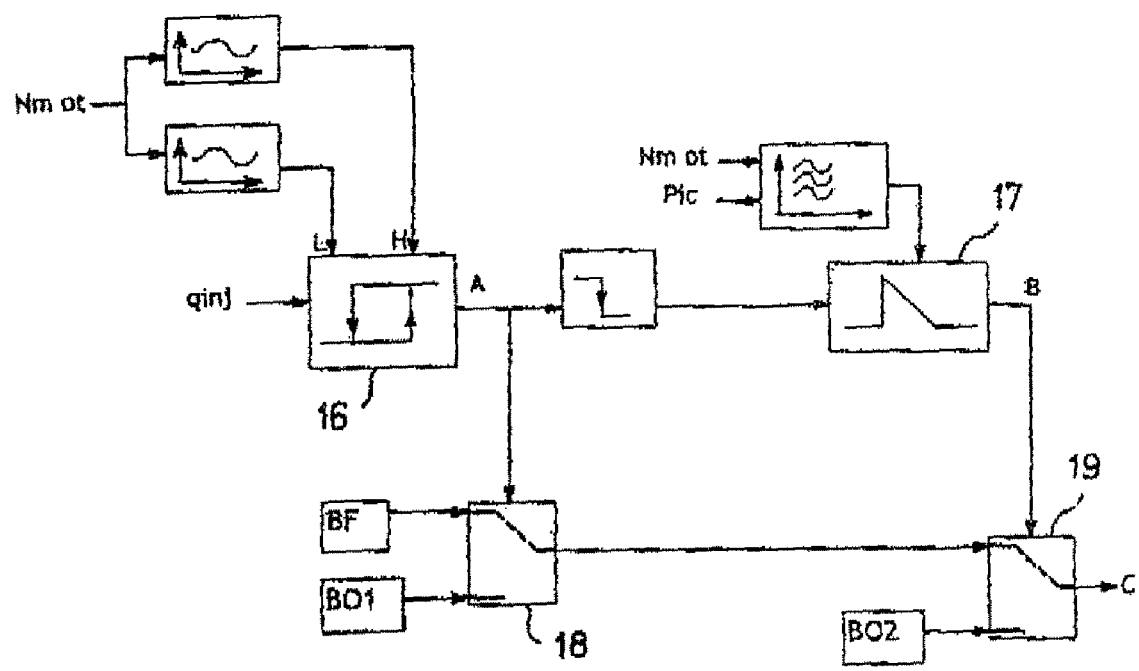
FIG. 2 is a basic diagram of the operation of an electronic control unit able to implement a first embodiment of the control method in accordance with the invention.

FIG. 2 illustrates the principle of the operation of the electronic control unit. FIG. 2 represents a circuit for determining operating mode.

The circuit represented comprises a foot lifting detector 16, a timer 17, a first switch 18 and a second switch 19.

The electronic control unit is able to control the supercharging system according to three possible operating modes.

According to a first operating mode called the "slaved" or "regulated operating mode", the electronic control unit transmits a control signal to the solenoid valve so as to adjust the position of the vanes of the turbine, the control signal being dependent on an error between the air pressure P2 measured by the pressure sensor in the intake manifold and a setpoint pressure value P. The first operating mode is a closed-loop operating mode (denoted BF in FIG. 2).

According to a second operating mode called the "controlled operating mode", the electronic control unit transmits a control signal to the solenoid valve so as to adjust the position of the vanes of the turbine, the control signal being dependent on the operating point of the engine (engine speed $N_{mot}$, engine torque $C_{mot}$). The second operating mode is an open-loop operating mode (denoted BO1 in FIG. 2).

According to a third operating mode called the "transient operating mode", the electronic control unit transmits a control signal to the solenoid valve so as to position vanes of the turbine in a predetermined fixed position. The third operating mode is an open-loop operating mode (denoted BO2 in FIG. 2).

The first switch 18 is able to toggle the electronic control unit from the first operating mode BF to the second operating mode BO1 and the second switch 19 is able to toggle the electronic control unit from the operating mode at the output of the first switch 18 to the third operating mode BO2.

The electronic control unit is programmed to toggle the supercharging system from one operating mode to another in the following manner.

Initially, the electronic control unit controls the supercharging system in regulated operating mode BF.

According to a first step, the electronic control unit detects a variation in an engine acceleration command. For this purpose, the electronic control unit compares the gross flow rate of fuel injected into the engine ($q_{inj}$) with a first low threshold (L) and with a second high threshold (H), the first and the second thresholds depending on the engine speed ($N_{mot}$).

The foot lifting detector 16 is represented by a hysteresis function receiving the flow rate variable $q_{inj}$ as input and generating a signal A taking the value 0 or 1 as output.

If $q_{inj}$ decreases and becomes less than the first threshold L, then the signal A takes the value 0.

If $q_{inj}$ increases and becomes greater than the second threshold H, then the signal A takes the value 1.

If the electronic control unit detects a foot lifting, the electronic control unit performs a second step.

According to this second step, the electronic control unit triggers the timer 17 and switches to the transient operating mode BO2 for a predetermined duration T.

The timer 17 receives the signal A as input and generates a signal B as output.

When the signal A vanishes, the signal B takes the value 1 then decreases and vanishes after a predetermined duration T. The timer 17 is calibratable and the duration T depends on the engine speed ($N_{mot}$) and the rate of air compression ($P_{ic}$) by the turbocompressor. The air compression rate $P_{ic}$ is equal to the ratio P2/P1, P2 being the pressure in the intake manifold of the engine and P1 being the pressure of the cool air tapped off from outside the vehicle.

When the signal B equals 1, the switch toggles from the output operating mode of the first switch 18 to the third operating mode BO2.

In the transient operating mode BO2, the vanes of the turbine are maintained in a predetermined fixed position. The vanes are for example maintained in a maximum opening position so as to effectively drain the intake manifold of the engine. Thus the compression ratio ($P_{ic}$) decreases rapidly and the turbocompressor operates outside of the pumping zone.

Moreover, when the signal A takes the value 0, the first switch 18 toggles from the first operating mode BF to the second operating mode BO1.

When the duration T has elapsed, the electronic control unit performs a third step.

According to a third step, the electronic control unit switches to the controlled operating mode BO1.

The second switch toggles from the third operating mode BO2 to the second operating mode BO1.

Figure 3:
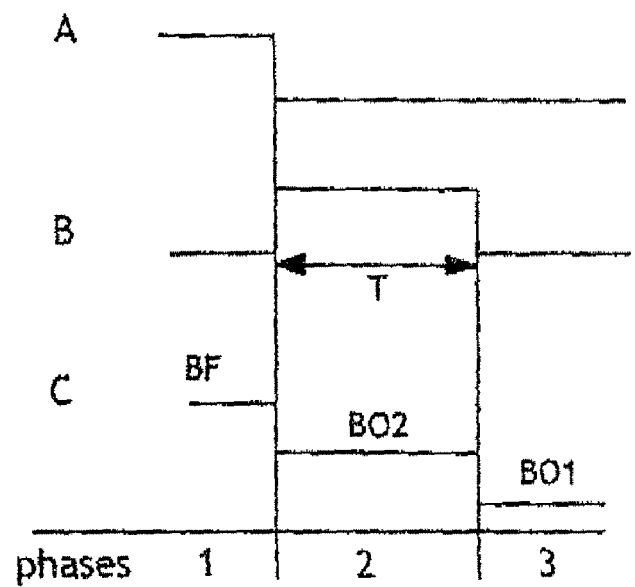
FIG. 3 represents in a diagrammatic manner various control phases of the supercharging system during a foot lifting detection according to the first embodiment.

FIG. 3 represents in a diagrwimatic manner various control phases of the supercharging system during a foot lifting detection.

As may be seen in FIG. 3, the supercharging system is initially in regulated operating mode (BF). The signal A equals 1 (Phase 1).

During a foot lifting detection, the signal A vanishes. The timer is triggered and the signal B becomes nonzero. The supercharging system switches to the transient operating mode (BO2).

The supercharging system is maintained in transient operating mode for a duration T (Phase 2).

When the duration T has elapsed, the signal B vanishes and the supercharging system switches to the controlled operating mode (BO1) (Phase 3).

Figure 4:
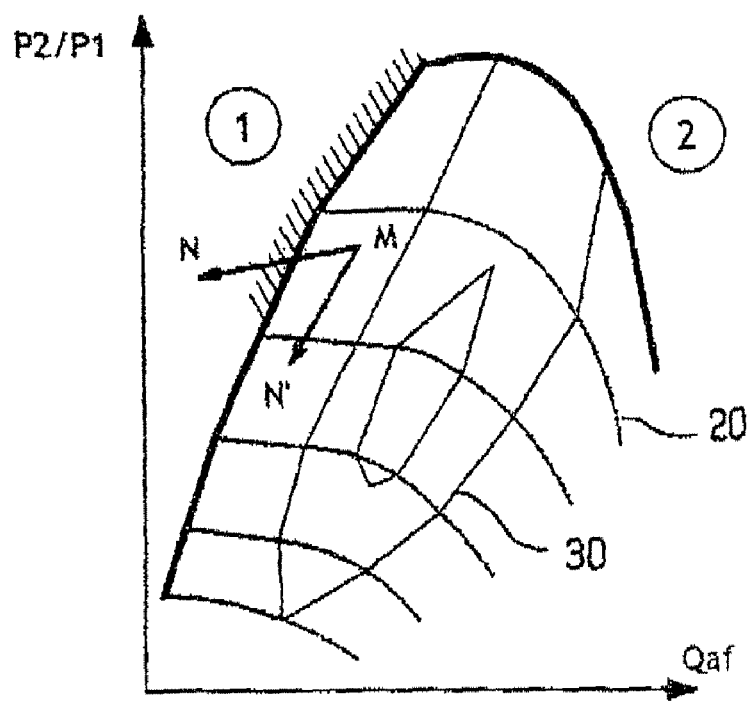
FIG. 4 represents in a diagrammatic manner a compressor field chart.

FIG. 4 represents in a diagrammatic manner a compressor field chart. On this chart, the curves 20 are iso-turbo speed curves and the curves 30 are iso-efficiency curves. Zone (1) is a pumping zone and zone (2) is an overspeed zone.

The abscissa of the chart is the flow rate of cool air ($Q_{af}$) admitted into the manifold of the engine and its ordinate is the compression rate (P2/P1) generated by the turbocompressor.

The point M represents an operating point of the engine before a foot lifting.

The point N represents an operating point of the engine immediately after a foot lifting, in the case of the supercharging systems of the prior art.

The point N' represents an operating point of the engine immediately after a foot lifting, in the case of a supercharging system controlled according to the method of the invention.

As is seen in FIG. 4, in the prior art, the action of reclosing the vanes during a foot lifting maintains compression rate while the air flow rate in the manifold drops, so that the operating point of the supercharging system switches to the pumping zone (point N).

The control method of the invention has the effect that the compression rate (P2/P1) decreases rapidly enough for the supercharging system not to enter the pumping zone (1).

Figure 5:
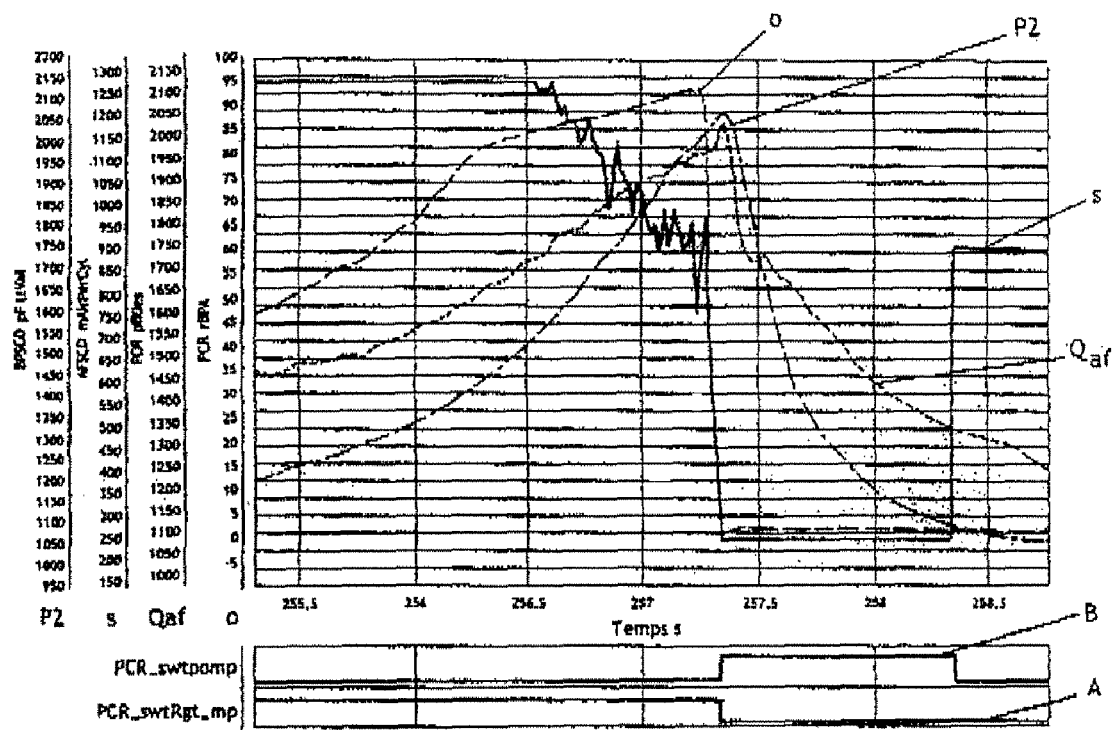
FIG. 5 is a chart representative of the evolution of operating parameters of the supercharging system during a foot lifting detection and when the first embodiment is implemented.

FIG. 5 is a chart representative of the evolution of operating parameters of the supercharging system during a foot lifting detection.

The chart represents the evolution of the following parameters:
supercharge pressure P2 measured in the intake manifold of the engine (in hectopascals),
flow rate $Q_{af}$ of cool air admitted into the engine
signal s for controlling the solenoid valve driving the opening and closing of the vanes of the turbocompressor,
the opening o of the vanes of the turbine (as a % of closure),
signal A of detecting a foot lifting,
signal B for controlling switching to anti-pumping transient operating mode.

The evolution of the parameters has been recorded for a foot lifting occurring when the engine is operating at full load at a speed of 1750 revolutions per minute.

The foot lifting is detected when the signal A vanishes. On the falling edge of the signal A, the antipumping transient operating mode is activated.

At this instant, the signal B switches to the value 1 indicating the triggering of the timer.

The vanes of the turbocompressor are maintained in the maximum opening position. The control signal for the solenoid valve driving the opening and closing of the vanes of the turbocompressor is at 0% during the transient phase.

It is noted that the flow rate of cool air admitted and the supercharge pressure drop rapidly. The supercharge pressure decreases by 800 hectopascals in 0.5 seconds.

Furthermore, the air flow rate is stable and does not exhibit any oscillations, thereby indicating that no pumping phenomenon arises.

The second embodiment of the method will now be described.

Figure 6:
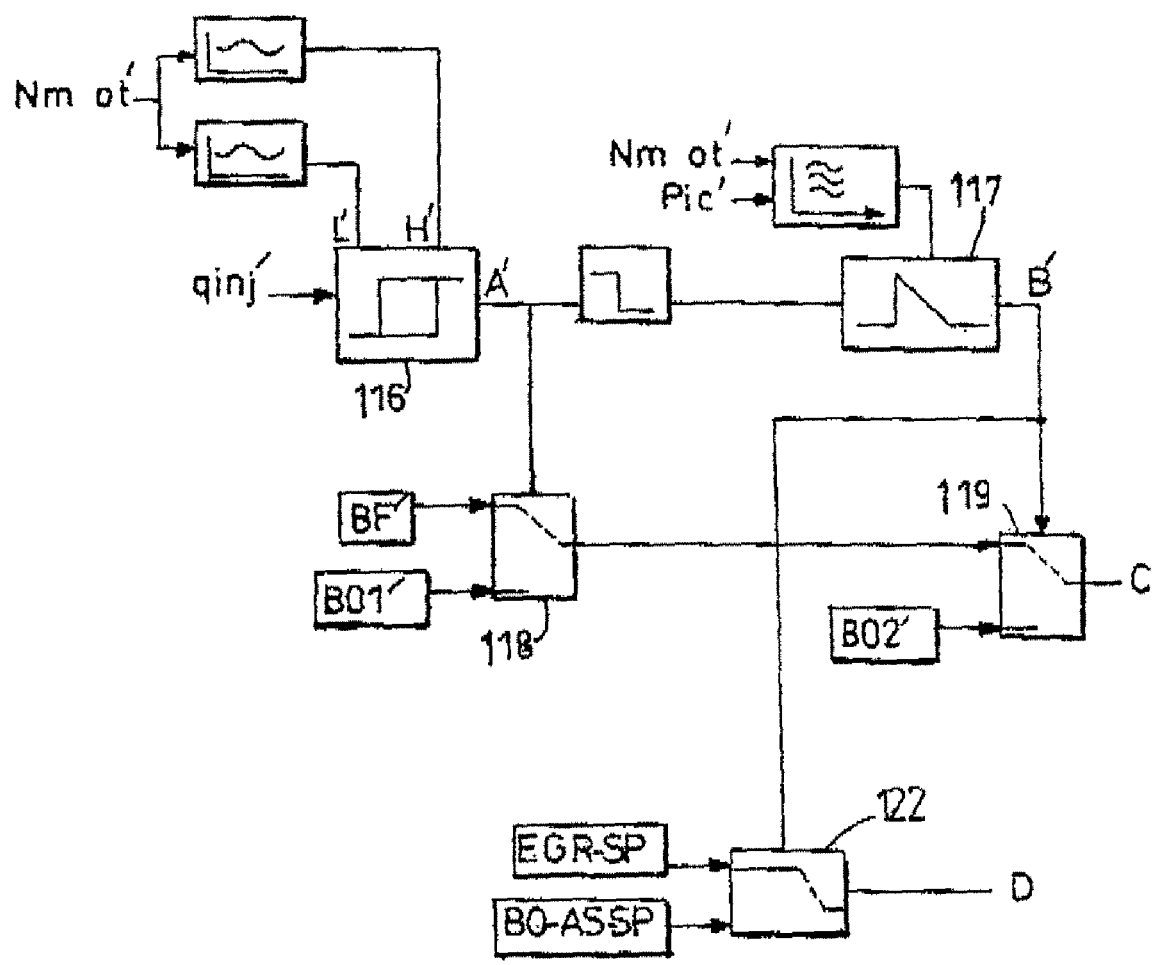
FIG. 6 is a basic diagram of the operation of an electronic control unit able to implement a second embodiment of the control method in accordance with the invention.

FIG. 6 illustrates the principle of the operation of the electronic control unit for this embodiment. FIG. 6 represents a circuit for determining operating mode.

The circuit represented comprises a foot lifting detector 116, a timer 117, a first switch 118, a second switch 119 and a third switch 122

In this second embodiment, the electronic control unit is able to control the supercharging system according to three possible operating modes.

According to a first operating mode of the supercharging system, called the "slaved" or "regulated operating mode", the electronic control unit transmits a control signal to the solenoid valve so as to adjust the position of the vanes of the turbine, the control signal being dependent on an error between the air pressure P2 measured by the pressure sensor in the intake manifold and on a setpoint pressure value P. The first operating mode is a closed-loop operating mode (denoted BF in FIG. 2).

According to a second operating mode of the supercharging system, called the "controlled operating mode", the electronic control unit transmits a control signal to the solenoid valve so as to adjust the position of the vanes of the turbine, the control signal being dependent on the operating point of the engine (engine speed $N_{mot}$, engine torque $C_{mot}$). The second operating mode is an open-loop operating mode (denoted B01 in FIG. 2).

According to a third operating mode of the supercharging system, called the "transient operating mode", the electronic control unit transmits a control signal to the solenoid valve so as to position vanes of the turbine in a predetermined fixed position. The third operating mode is an open-loop operating mode (denoted BO2 in FIG. 2).

The electronic control unit is furthermore able to control the exhaust gas recirculation system according to two operating modes.

According to the first operating mode of the recirculation system, the position of the exhaust gas recirculation valve is calculated as a function of the regulation strategy implanted in the electronic control unit. The first operating mode is a closed-loop operating mode (denoted EGR_SP in FIG. 6).

According to another operating mode of the gas recirculation system, the electronic control unit transmits a constant control signal to the gas recirculation valve 13 so as to give it a predetermined fixed position whatever the operating point of the engine. The second operating mode is an open-loop operating mode (denoted BO_AS_SP in FIG. 6).

The first switch 118 is able to toggle the electronic control unit from the first operating mode BP to the second operating mode BO1 and the second switch 119 is able to toggle the electronic control unit from the operating mode at the output of the first switch 118 to the third operating mode BO2.

The third switch 122 is able to toggle the electronic control unit from the first operating mode EGR_SP to the second operating mode BO_AS_SP.

The electronic control unit is programmed to toggle the supercharging system and the gas recirculation system from one operating mode to another in the following manner.

Initially, the electronic control unit commands the supercharging system to regulated operating mode BF and the gas recirculation system to regulated mode EGR_SP.

According to a first step, the electronic control unit detects a variation in an engine acceleration command. For this purpose, the electronic control unit compares the gross flow rate of fuel injected into the engine ($q_{inj}'$) with a first low threshold (L') and with a second high threshold (H'), the first and the second thresholds depending on the engine speed ($N_{mot}'$).

The foot lifting detector 116 is represented by a hysteresis function receiving the flow rate variable $q_{inj}'$ as input and generating a signal A' taking the value 0 or 1 as output.

If $q_{inj}'$ decreases and becomes less than the first threshold L', then the signal A' takes the value 0.

If $q_{inj}$ increases and becomes greater than the second threshold H' then the signal A' takes the value 1.

If the electronic control unit detects a foot lifting, the electronic control unit performs a second step.

According to this second step, the electronic control unit triggers the timer 117 and switches to the transient operating mode BO2' in respect of the supercharging system and to operating mode BO_AS_SP in respect of the recirculation system for a predetermined duration T'.

The timer 117 receives the signal A' as input and generates a signal B' as output.

When the signal A' vanishes, the signal B, takes the value 1 then decreases and vanishes after a predetermined duration T'. The timer 117 is calibratable and the duration T' depends on the engine speed ($N_{mot}'$) and the rate of air compression ($P_{ic}'$) by the turbocompressor at the moment the foot is lifted.

The air compression rate $P_{ic}'$ is equal to the ratio P2/P1, P2 being the pressure in the intake manifold of the engine and P1 being the pressure of the cool air tapped off from outside the vehicle.

When the signal B' equals 1, the switch 119 toggles from the output operating mode of the first switch 118 to the third operating mode BO2' and the third switch 122 toggles from the operating mode EGF_SP to the operating mode BO_AS_SP.

In the transient operating mode BO2', the vanes of the turbine and the recirculation valve are maintained in a predetermined fixed position. The vanes and the recirculation valve are for example maintained in a maximum opening position so as to effectively drain the intake manifold of the engine. Thus the compression ratio ($P_{ic}'$) decreases rapidly and the turbocompressor operates outside of the pumping zone.

Moreover, when the signal A' takes the value 0, the first switch 118 toggles from the first operating mode BF' to the second operating mode BO1'.

When the duration T' has elapsed, the electronic control unit performs a third step.

According to a third step, the electronic control unit switches to the controlled operating mode BO1'.

The second switch 119 toggles from the third operating mode BO2' to the second operating mode BO1' and the third switch regains its initial position EGR_SP.

Figure 7:
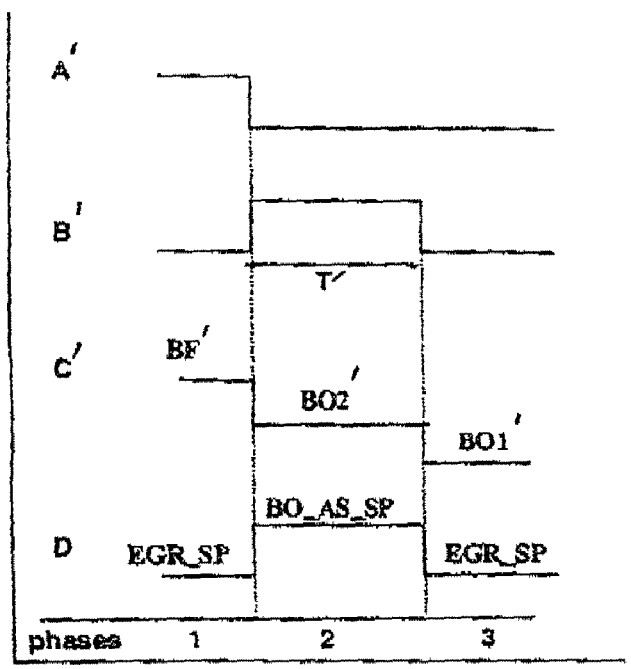
FIG. 7 represents in a diagrammatic manner various control phases of the supercharging system and of the gas recirculation system during a foot lifting detection according to the second embodiment.

FIG. 7 represents in a diagrammatic manner various control phases of the supercharging system during a foot lifting detection.

As may be seen in FIG. 7, the supercharging system is initially in the regulated operating mode (BF'). The signal A' equals 1 (Phase 1).

During a foot lifting detection, the signal A' vanishes. The timer is triggered and the signal B' becomes nonzero. The supercharging system switches to the transient operating mode (BO2') and the exhaust gas recirculation system switches to the transient operating mode (BO_AS_SP).

The supercharging system and the recirculation system are maintained in the transient operating mode for a duration T' (Phase 2).

When the duration T' has elapsed, the signal B' vanishes and the supercharging system switches to the controlled operating mode (BO1') (Phase 3) while the recirculation system reverts to the normal operating mode (EGR_SP).

Figure 8:
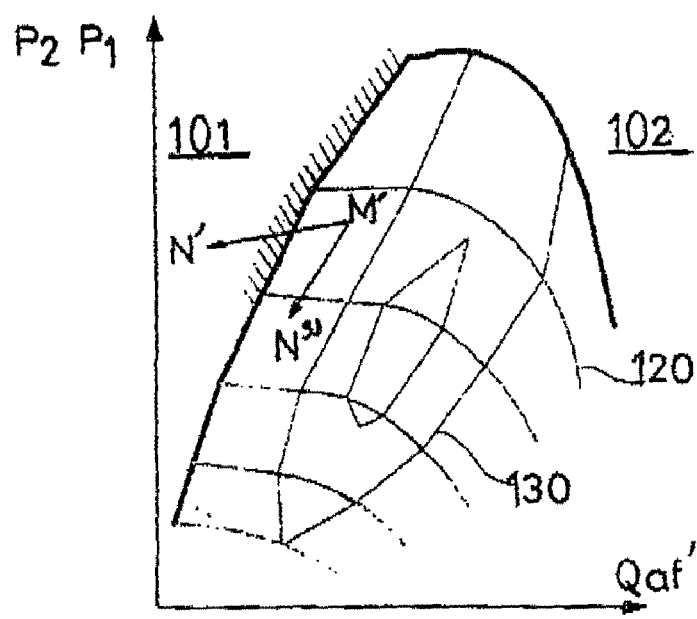
FIG. 8 represents in a diagrammatic manner a compressor field chart.

FIG. 8 represents in a diagrammatic manner a compressor field chart.

On this chart, the curves 120 are iso-turbo speed curves and the curves 130 are iso-efficiency curves. Zone (101) is a pumping zone and zone (102) is an overspeed zone.

The abscissa of the chart is the flow rate of cool air ($Q_{af}'$) admitted into the manifold of the engine and its ordinate is the compression rate (P2/P1) generated by the turbocompressor.

The point M' represents an operating point of the engine before a foot lifting.

The point N' represents an operating point of the engine immediately after a foot lifting, in the case of the supercharging systems of the prior art.

The point N" represents an operating point of the engine immediately after a foot lifting, in the case of a supercharging system controlled according to the method of the invention.

As seen in FIG. 8, in the prior art, the action of reclosing the vanes during a foot lifting maintains the compression rate while the air flow rate in the manifold drops, so that the operating point of the supercharging system switches to the pumping zone (point N').

The control method of the invention, in this embodiment, has the effect that the compression rate (P2/P1) decreases rapidly enough for the supercharging system not to enter the pumping zone (1).

Figure 9:
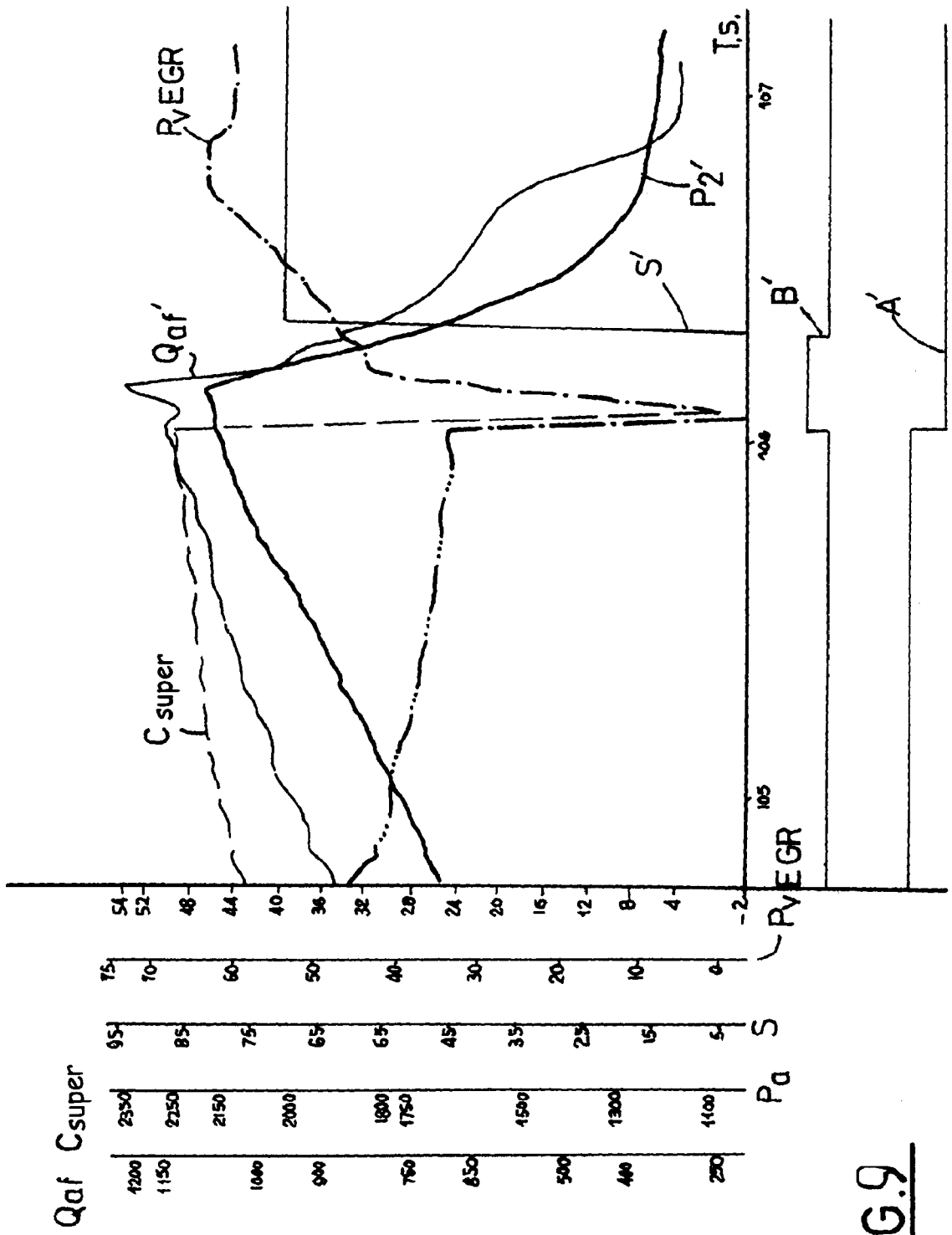
FIG. 9 is a chart representative of the evolution of operating parameters of the supercharging system during a foot lifting detection and when the second embodiment is implemented.

FIG. 9 is a chart representative of the evolution of operating parameters of the supercharging system during a foot lifting detection.

The chart represents the evolution of the following parameters:

supercharge pressure P2' measured in the intake manifold of the engine (in hectopascals), flow rate $Q_{af}'$ of cool air admitted into the engine, control signal s' for the solenoid valve driving the opening and closing of the vanes of the turbocompressor, supercharge pressure setpoint Csuper position $P_{vEGR}$ of the gas recirculation valve (as an opening percentage)

lifting detection signal A' for a toot lifting.

control signal B' for switching to anti-pumping transient operating mode.

The evolution of the parameters has been recorded for a foot lifting occurring when the engine is operational at full load at a speed of 1650 revolutions per minute.

The foot lifting is detected when the signal A' vanishes. On the falling edge of the signal A', the antipumping transient operating mode is activated.

When the signal B' switches to the value 1 indicating the triggering of the timer, the vanes of the turbocompressor are maintained in the maximum opening position. The control signal for the solenoid valve driving the opening and closing of the vanes of the turbocompressor is at 0% during the transient phase. The exhaust gas recirculation valve is also maintained in a maximum opening position.

It is noted that the flow rate of cool air admitted and the supercharge pressure drop rapidly.

Furthermore, the air flow rate is stable and does not exhibit any oscillations, thereby indicating that no pumping phenomenon arises.

A variant of the strategy for driving the gas recirculation system will be able to have a specific foot lifting detection device, with its own duration of activation and an opening of the exhaust gas recirculation valve depending on the operating point of the engine (engine speed, supercharge pressure, pressure upstream of the turbine).

Furthermore, the step of detecting a variation in an engine acceleration command may be directly performed on the basis of the position of the acceleration pedal.

The invention claimed is:

1. A method of controlling an internal combustion engine including a supercharging system including a turbocompressor, an exhaust gas recirculation system including a recirculation valve, and an electronic control unit configured to control a geometric configuration of the turbocompressor and of the valve of the recirculation system, the method comprising:

while the supercharging system is operating according to a first regulated operating mode, detecting a variation in an engine acceleration command;

as a function of the detected variation, toggling the supercharging system into a transient operating mode in which the turbocompressor is maintained in a given geometric configuration for a predetermined duration; and after the predetermined duration, toggling the supercharging system into a second controlled operating mode in which the geometric configuration of the turbocompressor is controlled as a function of an operating point of the engine.

2. The control method as claimed in claim 1, further comprising toggling, as a function of the detected variation, the recirculation system of the exhaust gases into a transient operating mode.

3. The control method as claimed in claim 2, wherein during the transient operating mode the recirculation valve is maintained in a given geometric configuration for a predetermined duration.

4. The control method as claimed in claim 2, wherein during the transient operating mode the geometric configuration of the exhaust gases recirculation valve is controlled as a function of an operating point of the engine.

5. The method as claimed in claim 1, wherein the detecting a variation in an engine acceleration command comprises comparing a fuel flow rate injected into the engine with a first threshold and determining whether the injected fuel flow rate is less than the first threshold.

6. The method as claimed in claim 5, wherein the first threshold depends on speed of the engine.

7. The method as claimed in claim 1, wherein the predetermined duration depends on engine speed.

8. The method as claimed in claim 1, wherein the predetermined duration depends on rate of compression of air by the turbocompressor.

9. The method as claimed in claim 1, wherein in the first regulated operating mode the geometric configuration of the turbocompressor is controlled as a function of a comparison between a parameter of measured pressure of air admitted by the engine and a setpoint pressure parameter.

10. The method as claimed in claim 9, wherein the detecting a variation in an engine acceleration command comprises comparing a fuel flow rate injected into the engine with a second threshold and determining whether the injected fuel flow rate is greater than the second threshold.

11. The method as claimed in claim 10, wherein the second threshold depends on engine speed.

12. An electronic control unit including a non-transitory computer-readable storage medium having programmed instructions stored thereon that control the engine electronic control unit to implement a method of controlling an internal combustion engine including a supercharging system including a geometric configuration turbocompressor, and an exhaust gas recirculation system including a recirculation valve, the non-transitory computer-readable storage medium comprising:

instructions for detecting a variation in an engine acceleration command while the supercharging system is operating according to a first regulated operating mode;

instructions for toggling the supercharging system into a transient operating mode in which the turbocompressor is maintained in a given geometric configuration for a predetermined duration as a function of the detected variation; and instructions for toggling the supercharging system into a second controlled operating mode after the predetermined duration, wherein, in the second controlled operating mode, the geometric configuration of the turbocompressor is controlled as a function of an operating point of the engine.

\* \* \* \* \*